(12) United States Patent
Krauthamer et al.

(10) Patent No.: US 12,169,293 B2
(45) Date of Patent: *Dec. 17, 2024

(54) AERIAL IMAGING USING RETROREFLECTION

(71) Applicant: Universal City Studios LLC, Universal City, CA (US)

(72) Inventors: Akiva Meir Krauthamer, Winter Garden, FL (US); Timothy Fitzgerald Garnier, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,056

(22) Filed: Oct. 11, 2023

(65) Prior Publication Data

US 2024/0036353 A1 Feb. 1, 2024

Related U.S. Application Data

(63) Continuation of application No. 17/512,367, filed on Oct. 27, 2021, now Pat. No. 11,803,067.

(60) Provisional application No. 63/110,216, filed on Nov. 5, 2020.

(51) Int. Cl.
*G02B 30/56* (2020.01)
*G02B 5/12* (2006.01)
*G02B 27/10* (2006.01)
*G03B 21/20* (2006.01)
*H04N 9/31* (2006.01)

(52) U.S. Cl.
CPC .............. *G02B 30/56* (2020.01); *G02B 5/12* (2013.01); *G02B 27/1066* (2013.01); *H04N 9/3155* (2013.01); *H04N 9/3179* (2013.01)

(58) Field of Classification Search
CPC ....... G02B 30/56; G02B 5/12; G03B 21/2046
See application file for complete search history.

(56) References Cited

U.S. PATENT DOCUMENTS

| | | | |
|---|---|---|---|
| 10,001,654 B2 | 6/2018 | Joseph et al. | |
| 10,739,613 B2 | 8/2020 | Joseph et al. | |
| 11,803,067 B2 * | 10/2023 | Krauthamer | ......... H04N 9/3179 |
| 2019/0094562 A1 | 3/2019 | Frayne et al. | |

OTHER PUBLICATIONS

Kazuki Otao, Transmissive mirror device based near-eye displays with wide field of view. ACM SIGGRAPH 2018 Emerging Technologies.

(Continued)

*Primary Examiner* — Ryan D Howard
(74) *Attorney, Agent, or Firm* — Fletcher Yoder, P.C.

(57) ABSTRACT

Systems and methods for generating real images via retroreflection are provided. An image source may project light beams, which are received at a beam splitter. The beam splitter, positioned between a retroreflector and a viewing area, may reflect the light beams toward the retroreflector. In turn, the light beams may be reflected back from the retroreflector and toward and through the beam splitter to generate a real image that appears to a viewer to be floating in the viewing area. A controller may control the image source to adjust the real image based on a control parameter detected by at least one sensor.

20 Claims, 12 Drawing Sheets

(56) References Cited

OTHER PUBLICATIONS

Digital Nature Group, Transmissive Mirror Device based Near-Eye Displays with Wide Field of View (SIGGRAPH 2018 E-tech), https://www.youtube.com/watch?v=Yresz2ERxhs&, Accessed on Feb. 11, 2020 YouTube.
Yoichi Ochiai, Make your own Retinal Projector: Retinal Near-Eye Displays via Metamaterials, SIGGRAPH '18 Emerging Technologies, Aug. 12-16, 2018, Vancouver, BC, Canada.
University of Tsukuba, Strategic Research Platform towards Digital Nature Powered by Pixie Dust Technologies. "Air Mount Retinal Projection." Digital Nature Group, Jul. 15, 2021, https://digitalnature.slis.tsukuba.ac.jp/2018/04/air-mount-retinal-projection/.
Yuta Yoshimizu and Eiji Iwase, "Radially arranged dihedral corner reflector array for wide viewing angle of floating image without virtual image," Opt. Express 27, 918-927 (Jan. 21, 2019).
Yutaka Tokuda, R2D2 w/ AIRR: Real time & Real space Double-Layered Display with Aerial Imaging by Retro-Reflection, Center for Optical Research and Education, Utsunomiya University The University of Tokyo, Conference Paper • Nov. 2015.
Suginohara, Hidetsugu, et al. "29-1: An Aerial Display: Passing through a Floating Image Formed by Retro-Reflective Reimaging." The Society for Information Display, John Wiley Sons, Ltd, Jun. 2, 2017, https://onlinelibrary.wiley.com/doi/abs/10.1002/sdtp.11631.
"AIRR Tablet: Floating Display with High-Speed Gesture UI—Interactive Display in 3D Free Space ." Active Perception: Human Interface, Ishikawa Group Laboratory, Data Science Research Division, Information Technology Center, University of Tokyo, http://www.k2.t.u-tokyo.ac.jp/perception/AIRR_Tablet/index-e.html, Accessed on Feb. 11, 2020.
"Tachi_Lab ." Tachi_Lab—Top, http://tachilab.org/, 2008-2021 Tachi Laboratory, The University of Tokyo, Accessed on Feb. 11, 2020.
"RF—A Series." RF—A Series | NCI, https://www.carbide.co.jp/en/product/rf-a-siries/, Nippon Carbide Industries Co.,Inc. Accessed on Feb. 11, 2020.
NaemuraLab. "Opaquelusion (2015)." YouTube, YouTube, May 28, 2016, https://www.youtube.com/watch?v=PPtTohsvjGA&;. Accessed on Feb. 11, 2020.
"Opaquelusion (2015)." YouTube, May 28, 2016, https://youtu.be/PPtTohsvjGA. Accessed on Feb. 11, 2020.
Ambient light adaptive aerial image from Koizumi Naoya on Vimeo, https://player.vimeo.com/video/155938533. Accessed on Feb. 11, 2020.
NaemuraLab. "Enchantable (2015)." YouTube, YouTube, 6 Sep. 2015, https://www.youtube.com/watch?v=mYYDfv4eZ2k&;. Accessed on Feb. 11, 2020.
Www.interaction-lpsj.org. http://www.interaction-ipsj.org/proceedings/2018/data/pdf/1C62.pdf, 2018 Information Processing Society of Japan Accessed on Feb. 11, 2020.
Sano, Ayaka, and Naoya Koizumi. "Mid-Air Imaging Technique for Architecture in Public Space." Electronic Imaging, vol. 2018, No. 4, 2018, https://doi.org/10.2352/issn.2470-1173.2018.04.sda-111. Accessed on Feb. 11, 2020.
"SD&A 2018: Mid Air Imaging Technique for Architecture in Public Space." YouTube, YouTube, Feb. 27, 2018, https://www.youtube.com/watch?v=wxxAVHU5bYI&&t=185s. Accessed on Feb. 11, 2020.
SENSbit. "Shadowless Projector." YouTube, YouTube, Aug. 30, 2018, https://www.youtube.com/watch v=xrKRMNIvkVg&&t=44s. Accessed on Feb. 11, 2020.
https://www.moguravr.com/wp-content/uploads/2017/10/201710051810329000.jpg 02 3D Delzo, Accessed on Feb. 11, 2020.
Toshiyuki1812. "CEATEC Japan Oct. 5, 2017 Asukanet 3D-DELZO." YouTube, YouTube, Oct. 10, 2017, https://www.youtube.com/watch?v=M6QhXWfrrFo&;. Accessed on Feb. 11, 2020.
"Gothro: Optical Design for Transfer of Camera Viewpoint Using Retrotransmissive Optical System." YouTube, YouTube, Feb. 14, 2019, https://www.youtube.com/watch?v=3YwtONqUArg&;. Accessed on Feb. 11, 2020.
"PortOn: Portable Mid-Air Imaging Optical System on Glossy Surfaces." YouTube, YouTube, Oct. 22, 2019, https://www.youtube.com/watch?v=HzPNa9-BLP8&;. Accessed on Feb. 11, 2020.
"Sunny Day Display." YouTube, YouTube, Feb. 11, 2019, https://www.youtube.com/watch?v=uN5RUQeXFOw&;. Accessed on Feb. 11, 2020.
YouTube. (Sep. 26, 2019). Levitar: Real space interaction through mid-air CG avatar. YouTube. Retrieved Oct. 27, 2021, from https://www.youtube.com/watch?v=tjzp_sfMBW0&;. Accessed on Feb. 11, 2020.
PCT/US2021/057865 Invitation to Pay Additional Fees mailed Mar. 28, 2022.
PCT/US2021/057865 International Search Report and Written Opinion mailed May 19, 2022.

* cited by examiner

AERIAL IMAGING USING RETROREFLECTION

CROSS-REFERENCE TO RELATED APPLICATIONS

This application is a continuation of U.S. patent application Ser. No. 17/512,367, entitled "AERIAL IMAGING USING RETROREFLECTION," filed Oct. 27, 2021, which claims priority from and the benefit of U.S. Provisional Application No. 63/110,216, entitled "AERIAL IMAGING USING RETROREFLECTION," filed Nov. 5, 2020, each of which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be understood that these statements are to be read in this light and not as admissions of prior art.

An amusement or theme park generally includes a variety of entertainment systems or attractions that each provides a unique experience for guests of the amusement park. For example, the amusement park may include different attraction systems, such as a roller coaster, a drop tower, a log flume, and so forth. Some attraction systems may include an environment that may have several different features, such as 3D imagery (e.g., an offset pair of two-dimensional images of a feature that, when viewed through appropriate lenses, creates an illusion of the feature being three-dimensional), volumetric displays, and special effects, which help immerse guests in the experience of the attraction system. Using projection technologies, guests may wear special viewing glasses (e.g., 3D glasses, augmented reality headset) to view 3D images and floating images. However, such viewing glasses may be inconvenient and may increase operating costs associated with projecting 3D media. For example, augmented reality headsets may need to be cleaned after use by each guest and may be expensive. Therefore, improved features and techniques related to 3D imagery are useful to provide a desirable effect or experience for the guests.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
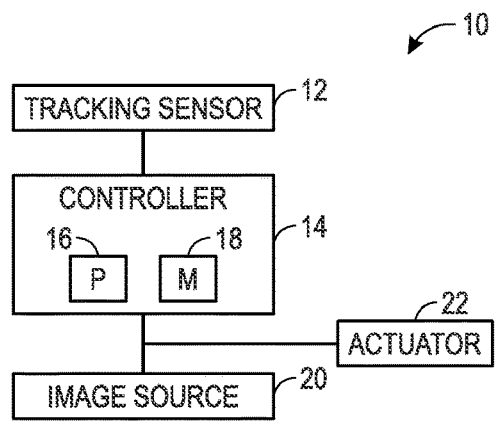
FIG. 1 is a block diagram of an illusion system that generates an aerial or real image using retroreflection, in accordance with an embodiment of the present disclosure.

The present disclosure relates generally to the field of special effects for use in interactive environments, such as a game environment or an amusement park. More specifically, the present disclosure is related to systems and methods for generating aerial or real images using retroreflection. As used herein, an aerial image or real image may be defined as a 2D or 3D image (e.g., a projected image) that may appear to float in air or may be observed mid-air without viewing glasses. A 2D image refers to what is typically considered a "flat" image provided in two dimensions (e.g., horizontal and vertical dimensions). An example of a typical 2D image includes an image projected on a traditional movie screen that looks flat to the observer. A 3D image is also a "flat" image in actuality, but it is provided in a manner that appears to be three dimensional. For example, a traditional manner of providing a 3D image includes providing two images of an object, one image for each of a viewer's eyes. In such traditional systems, using special glasses that limit viewing of the respective images to the viewer's respective eyes, an illusion of three dimensionality is provided to the viewer. It should be noted that, in accordance with present embodiments, a 2D image can be projected in a manner that makes it appear to be hovering in a three dimensional environment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

An amusement park may include an illusion system that creates special effects by generating aerial images using retroreflection to provide a desirable guest experience at an amusement park attraction. Indeed, combinations of certain hardware configurations (e.g., circuitry), software configurations (e.g., algorithmic structures and/or modeled responses), as well as certain attraction features may be utilized to provide guests with aerial images.

As used herein, an aerial or real image may be defined as a 2D or 3D image that may appear to float in air or may be observed mid-air without viewing glasses. The aerial or real image may be projected in air based on positioning of an image source (e.g., a light source) and/or retroflection techniques. The image source may be any suitable size or shape, and may include a number of discrete sources. In some embodiments, the image source may be a light source that helps illuminate or project a 2D image, a 3D image, or both. Non-limiting examples of the light source may include one or more light-emitting diode (LED) or organic light-emitting diode (OLED) string lights, one or more LED or OLED displays, one or more LED or OLED panels, one or more LED or OLED lamps, a flat screen television, a liquid crystal display (LCD), a light matrix, and one or more projectors.

By way of example, the light source may project multiple or numerous light beams such that the light beams diverge from the light source. The light beams may be directed to a beam splitter. The beam splitter may be any suitable size and shape (e.g., cube, plate). A composition of the beam splitter may include glass, plastic, or any fully or partially transparent material. As used herein, the beam splitter may be an optical device configured to split or separate a light beam into two or more different light beams. The beam splitter includes a layer of material configured to reflect and transmit light. After the light beams have reached the beam splitter, a first portion of the light beams may be refracted or transmitted though the beam splitter. As such, the light beams may be separated into multiple different lights beams of varying light intensity and optical power. These multiple different light beams may have a decreased light intensity compared to the light beams originally diverging from the light source. The beam splitter may be configured such that less than 20% of the light beams 54 (e.g., 10%, 15% of the light beams 54) are transmitted through the beam splitter. Meanwhile, a second portion of the light beams may be reflected off the beam splitter and directed to a retroreflector. For example, the beam splitter may be configured to reflect at least 80% of the light beams 54 (e.g., 90%, 95% of the light beams 54) toward the retroreflector. The beam splitter may be positioned in between the retroreflector and a viewing area. The viewing area is a physical space in which the guest may be disposed to be able to view the real image.

The retroreflector may be a device or surface that reflects light back to its origin with limited scattering. That is, the retroreflector may receive each light beam of the second portion of light beams at a particular angle and may reflect each light beam of the second portion back to its origin (e.g., the beam splitter) at the particular angle. The retroreflector may retroreflect light to an origin area (e.g., within error bands of a less than 5%) with an efficiency of anywhere between 70-100% (e.g., 70-75%, 75-80%, 80-85%, 85-90%, 90-95% or even 100% efficiency).

The retroreflector may be any suitable size, shape or color. Generally, as quality of the retroreflector increases, scattering of reflected light at the beam splitter may reduce. Each light beam of the second portion of light beams that have reflected off the retroreflector may pass through the beam splitter and converge to form an image based on the light source (e.g., real image, aerial image). Real images or aerial images may be generated when light beams associated with the second portion appear to converge at a point in space. As set forth herein, real images and aerial images may be used interchangeably. That is, when a real image or aerial image is generated via retroreflection, the real image or aerial image may appear to a guest to be floating in air.

As mentioned previously, retroreflective techniques may be used to provide special effects or enhance guest experiences at an amusement park. For example, a special effect may include imagery that looks like a lightning bolt shooting out from a sword after a guest has made an achievement by moving the sword in a particular pattern. In order to generate a real image of the lightning bolt, a controller of the illusion system may track, via one or more sensors, the position of a display object or a position where the real image is expected to be generated. In this example, the real image may be generated such that it appears to project from an endpoint of the sword that is farthest away from the guest. In some embodiments, the display object may be a prop, a handheld object (e.g., staff), or a hand of the guest. The one or more sensors may be configured to detect a location of the display object or a location of the guest within the viewing area. From the viewing area, the guest may be able to see the real image (e.g., lightning bolt shooting out from a staff).

Further, given the position of the image source or the source of the light beams (e.g., LED string lights, LED display), an expected position of the real image may be calculated. That is, the distance from the source of the light beams to the beam splitter is similar to the distance from the real image to the beam splitter. In other words, the position of the real image is the mirrored position of the source of the light beams about the beam splitter. The controller may be configured to control the image source to provide the real image such that the real image appears spatially associated with the display object. That is, a controller adjusts an image source such that a location of intersecting light beams defining the real image correlates to the location of the display object. If the real image is spatially associated with the display object, both the real image and the display object are arranged at similar points in space. Thus, positioning of the display object is connected with or impacts the positioning of the real image. Techniques implemented by the controller to control the image source such that the real image appears specially associated with the display object will be discussed below.

Light beams (e.g., diverging light beams) associated with the lightning bolt may be emitted from one or more LED string lights and directed to the beam splitter. A portion of the light beams may be reflected off the partially or fully transparent beam splitter and directed towards the retroreflector. In turn, the retroreflector may reflect the light beams in a similar magnitude and angle as received back to the beam splitter. The light beams may pass through the beam splitter and converge to form a real image of the source (e.g., real image representing a lightning bolt). From the perspective of the guest, it may appear as if the lightning bolt is shooting out from the sword. In reality, the appearance of the lightning bolt is a result of generating an aerial image of a lightning bolt via retroreflection.

The source of the light beams may be string lights, a projector, a grid of lights (e.g., LEDS), a light field display, and the like. However, the grid of LEDs may be susceptible to individual LED lights blocking one another if the grid is in full volume. The light field display may produce 3D aerial images based on a vector function that describes the amount of light flowing in every direction through every point in space. However, the light field display may be expensive and difficult to obtain. In some embodiments, in order to generate accurate aerial images in a cost-effective manner, the source of the light beams within the illusion system may include string lights. The string lights may be any suitable number or type of lights such as LED string lights, OLED string lights, fluorescent string lights, and so forth.

For example, the illusion system may include multiple LED string lights, and each LED string light may be disposed in different locations in an area behind the beam splitter. Based on calculating or tracking an expected position of the real image, a particular LED string light may be activated from the multiple LED string lights. Tracking the expected position may be based on tracking a user, a prop (e.g., a toy) or a device using any of various tracking techniques such as radio-frequency identification (RFID) monitoring, GPS, cameras, motion sensors, and so forth. In some embodiments, the controller may calculate the expected position of the real image in response to detecting motion data (e.g., correlating with a predefined motion signature) associated with the guest (e.g., waving of the sword) via one or more sensors. By way of example, the controller may determine that the endpoint of the sword (e.g., the position of the sword from which the lightning bolt is expected to emanate) is at angle of 39 degrees with respect to the beam splitter. That is, if the real image is expected to be displayed to a guest at 39 degrees from the beam splitter, then the controller may determine which LED string light from the multiple LED string lights to activate in order to generate a real image at 39 degrees from the beam splitter. For example, the controller may determine that an LED string light positioned at 45 degrees from the beam splitter is most similar in angle to a position of the real image at 39 degrees from the beam splitter compared to the other LED string lights. Thus, the controller may activate the LED string light at an angle of 45 degrees.

In some embodiments, the source of the light beams (e.g., the multiple LED lights) and retroreflector may be disposed behind the beam splitter such that both are hidden from the direct line of sight of the guest. As mentioned above, the distance from the LED string light to the beam splitter is similar in distance with respect to the distance from the real image to the beam splitter. The position of the real image is the mirrored position of the source of the light beams about the beam splitter. The source of the light beams may be controlled such that the real image appears specially associated with the display object. That is, the angle of the LED string light that has been activated affects the expected position of the real image. Because the controller may have activated the LED string light positioned at 45 degrees from the beam splitter, the position of the real image may be at 45 degrees from the beam splitter as well. Given positioning constraints of the multiple LED lights, the position of the real image at 45 degrees may be the most similar in angle to the position of the endpoint of the sword at 39 degrees. The difference in angle between 45 degrees and 39 degrees may be negligible to the human eye. Thus, it may appear that a lightning bolt (e.g., real image) has been emitted from the sword to the guest when the controller has activated the LED string light at 45 degrees.

In an alternative or additional embodiment, the illusion system may include one or more movable string lights, such that one or both ends of a string light may be motorized. For example, in response to the controller determining an expected position of the real image to be at 39 degrees from the beam splitter (e.g., based on detection of a position of the display object), the controller may instruct an actuator to move a string light to an angle of 39 degrees from the beam splitter.

Turning to the figures, FIG. 1 illustrates a block diagram of an illusion system 10 that generates aerial or real images using retroreflection, in accordance with an embodiment of the present disclosure. As shown, the illusion system 10 may include an image source 20 (e.g., light source), a controller 14 (e.g., a programmable logic controller or computer), and one or more sensors 12 (e.g., motion sensor, light sensor, heat sensor). As mentioned previously, the image source 20 may include one or more string lights. In some embodiments, the image source 20 (e.g., the string lights) may be actuatable (e.g., movable via one or more actuators 22).

Movement of the image source 20 may be controlled by an actuator 22 coupled to the image source 20. The actuator 22 may be any suitable type and number of actuators for providing motion, including, but not limited to, an electrical actuator, a pneumatic actuator, a mechanical actuator, a linear actuator, a rotary actuator, or any combination thereof. Based on instructions from the controller 14, the actuator 22 may regulate the movement of the image source 20 (e.g., string light, projector, or display). In some embodiments, the actuator 22 represents a set of multiple actuators that connect to the image source 20 and provides motion of the image source 20. As mentioned above, in response to the controller 14 detecting motion data associated with the guest (e.g., waving of a hand or prop) and determining an expected position of the real image, the controller 14 may instruct the actuator 22 to move the source (e.g., a string light) such that the angle of the source is similar in angle as the expected position of the aerial image. By way of example, if the real image is expected to be displayed to a guest at 39 degrees, then the controller 14 may instruct an actuator to move a LED string light to an angle of 39 degrees from the beam splitter. In another embodiment, the controller may activate an LED string light positioned at an angle of 45 degrees as it is closest in angle of the expected position of the real image compared to the other LED string lights. In other embodiments, different techniques for correlating the real image to desired locations (e.g., detected positioning of a prop or person) may be employed, such as activating different pixels on a display.

As illustrated, the one or more sensors 12 and the image source 20 are each communicatively coupled to the controller 14 of the illusion system 10. In some embodiments, the image source 20 may be communicatively coupled to the controller 14 via the actuator 22. The controller 14 includes a processor 16 and a memory 18. The controller 14 may control light beams emitted by the image source 20 based on signals received from the one or more sensors 12. For example, the one or more sensors 12 may determine a position of the display object (e.g., prop or hand) or a position where the real image is expected to be generated and may output a sensor signal indicative of the position of the display object (e.g., handheld object, prop) to the controller 14. Based on the position of the display object indicated by the sensor signal, the controller 14, via the processor 16, may activate and/or update the position of the image source 20 that emits light beams. The emitted light beams are reflected off a beam splitter and subsequently directed to a retroreflector. In some embodiments, the controller 14 may output a control signal indicative of the position of the image source 20 to the actuator 22. Based on receiving the control signal, which indicates the position of the image source 20 from the controller 14, the actuator 22 may move an LED string light such that the LED string light is in a similar position as indicated by the control signal.

In certain embodiments, the actuator and the one or more sensors 12 are communicatively coupled to the controller 14. The controller 14 may execute hardware and/or software control algorithms to regulate activation or movement of the image source 20. This may include activating different portions (e.g., different pixels of a display or portions of a matrix of lights) of the image source 20. The controller 14 may include a programmable logic controller (PLC) or other suitable control device. According to some embodiments, the controller 14 may include an analog to digital (A/D) converter, one or more microprocessors or general or special purpose computers, a non-volatile memory, memory circuits, and/or an interface board. For example, the controller 14 may include memory circuitry for storing programs, control routines, and/or algorithms implemented for control of the various system components, such as speed of moving the string of light. The controller 14 also includes, or is associated with, input/output circuitry for receiving sensed signals from the one or more sensors 12, and interface circuitry for outputting control signals. Memory circuitry may store set points, actual values, historic values, and so forth, for any or all such parameters. Any other suitable devices may be included in the illusion system 10, such as additional transducers or switches that sense motion, light, sound, and so forth related to the guest. Further, other values and/or set points may be used to determine when and how to operate the image source 20 (e.g., movement of the string light and/or activating a particular string light from multiple string lights). For example, the controller 14 may determine the distance and angle of the image source 20 from the beam splitter, the frequency and time period for activating or moving the image source 20, which may include activating or moving a portion of the image source 20, and so forth. The controller 14 also may include components for operator interaction with the aspects of the illusion system 10, such as display panels and/or input/output devices for checking operating parameters, inputting control signals representative of set points and desired operating parameters, checking error logs and historical operations, and so forth. The controller 14 may receive data from the one or more sensors 12 and/or control the actuator 22, which in turn controls the position of the image source 20 to generate an aerial image. In other embodiments, aspects of the image source 20 may be directly controlled without involving the actuator 22. For example, the image source 20 may be controlled to change a display to achieve a similar result.

The controller 14 may include one or more processor(s) 16 (e.g., a microprocessor(s)) that may execute software programs to determine the expected position of the real image. The processor(s) 16 may process instructions for execution within the illusion system 10. The processor(s) 16 may include single-threaded processor(s), multi-threaded processor(s), or both. The processor(s) 16 may process instructions and/or information (e.g., control software, look up tables, configuration data) stored in memory devices 18 or on storage device(s). The processor(s) 16 may include hardware-based processor(s), each including one or more cores. Moreover, the processor(s) 16 may include multiple microprocessors, one or more "general-purpose" microprocessors, one or more system-on-chip (SoC) devices, one or more special-purpose microprocessors, one or more application specific integrated circuits (ASICs), and/or one or more reduced instruction set computer (RISC) processors. The processor(s) 16 may be communicatively coupled to the one or more sensors 12, the actuator 22, and/or other electronic devices.

The memory device 18 may include a tangible, non-transitory, machine-readable medium, such as a volatile memory (e.g., a random access memory (RAM)) and/or a nonvolatile memory (e.g., a read-only memory (ROM), flash memory, a hard drive, and/or any other suitable optical, magnetic, or solid-state storage medium). The memory device 18 may store a variety of information that may be used for various purposes. For example, the memory device 18 may store machine-readable and/or processor-executable instructions (e.g., firmware or software) for the processor 16 to execute to correlate a detected location of a user or prop with where the real image should be presented. In particular, the memory device 18 may store instructions that cause the processor 16 to regulate the image source 20 to achieve a desired presentation by, for example, operating or moving the image source 20 to provide a real image that will be observed as having a correspondence to a position of a user or prop.

In certain embodiments, the one or more sensors 12 may include any of various sensor types useful in detecting the presence of the guest, location of the guest and the display object, and/or motion data indicative of the performance of certain motions (e.g., correlating with predefined motion signatures) to the controller 14. As such, the one or more sensors 12 may detect changes in motion, light, sound, and so forth related to the guest. For example, the one or more sensors 12 may include any number of location sensors, motion sensors, proximity sensors, ultrasonic sensors, photoelectric sensors, micro-electromechanical system (MEMS) sensors, sound sensors, and/or cameras. For example, the camera may detect location and movement of the guest (e.g., body movement, facial features, and/or other portions of the guest). Additionally, the camera may detect movement and location of the display object (e.g., a prop, such as a toy sword).

Figure 2:
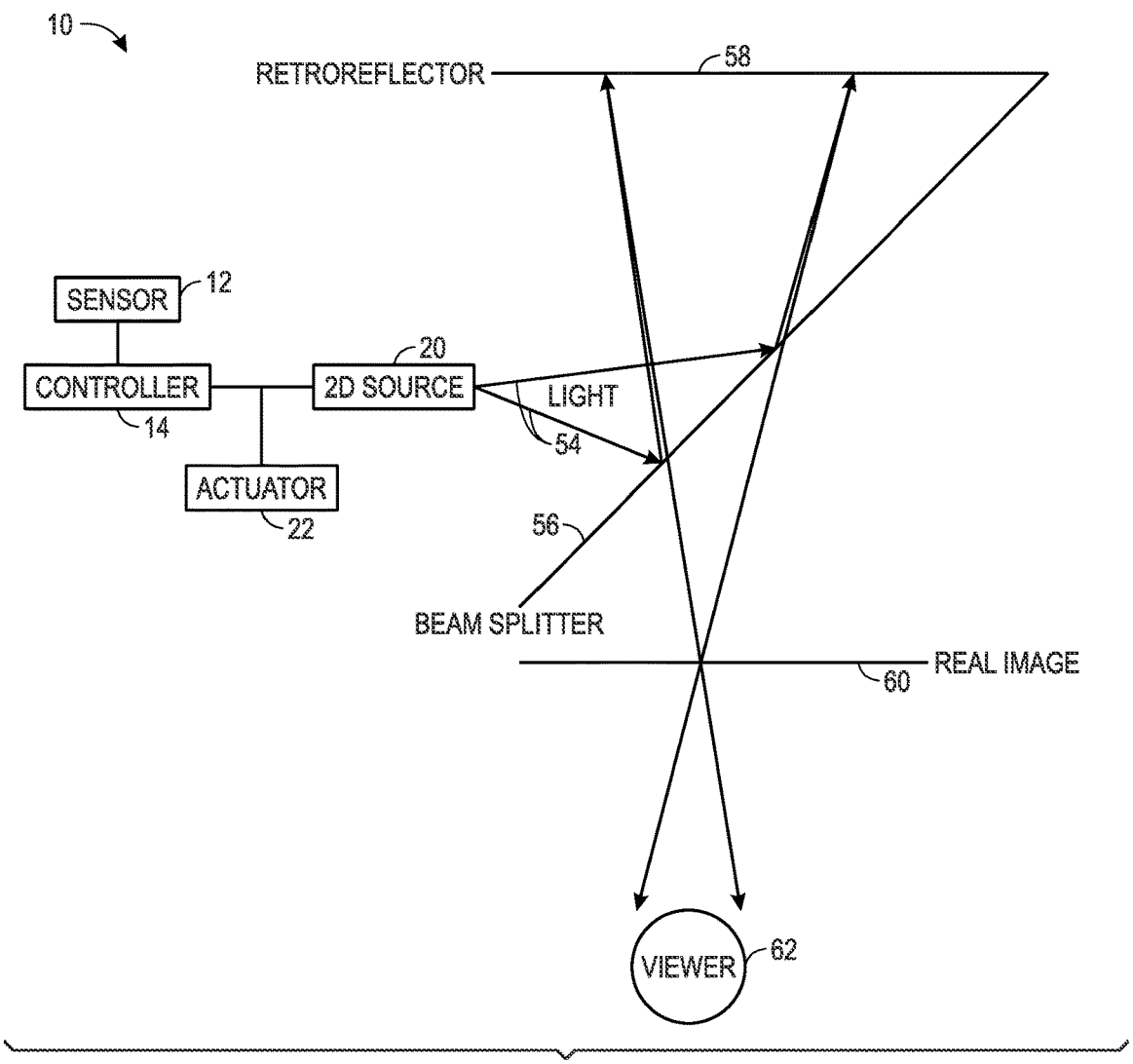
FIG. 2 is a schematic, plan view of the illusion system of FIG. 1 generating the real image based on a 2D source, in accordance with an embodiment of the present disclosure.

With the preceding in mind, FIG. 2 illustrates a schematic, plan view of the illusion system 10, generating a real image 60 observable by a viewer or guest 62 and based on a 2D image source 20 (e.g., 2D source 20), in accordance with an embodiment of the present disclosure. As used herein, the 2D source may be a 2D image or projection used to generate the real image 60. For example, the 2D source may include a 2D image illuminated by one or more LED string lights. The 2D source 20 may also include a projection generated by a screen projector or some other 2D image provider. Further, positioning of the 2D source 20 may be configurable based on the controller 14 receiving instructions from the one or more sensors 12 indicating an expected position of the real image 60. Based on the instructions from the controller 14, the actuator 22 may regulate the movement of the 2D source 20 (e.g., string light, projector, or display). The 2D source 20 may generate light beams 54 that define the 2D image. It should be noted that the two lines representing light beams 54 in FIG. 2 are meant to represent edges of the provided 2D image but the light beams 54 also include light beams in between the two lines, which may be considered as forming the body of the provided 2D image.

As shows in FIG. 2, a beam splitter 56 may be arranged with a surface running transverse to a direction of the light beams 54 emitted from the 2D source 20. The light beams 54 are illustrated as expanding from the 2D source 20 to the beam splitter 56 as they diverge. A portion of the light beams 54 from the 2D source 20 may be reflected from the beam splitter 56 and directed towards a retroreflector 58 positioned behind the beam splitter 56 with respect to the guest (e.g., viewer) 62. The beam splitter 56 may be partially or fully transparent and may be composed of any suitable material such as glass or plastic. For example, the beam splitter 56 may be partially mirrored but it must be able to transmit light through it as well because the properties of reflection and transmission are both used by the beam splitter 56 in the illusion system 10 to provide the desired effect. An amount of reflection by the beam splitter 56 may depend on angle of incidence with respect to the light beams 56.

As mentioned above, the retroreflector 58 may be a device or surface that reflects light back to its origin with very limited scattering. That is, the retroreflector 58 may receive each light beam 54 at a particular angle and may reflect each light beam 54 back to its origin (e.g., the beam splitter 56) essentially at the particular angle. The retroreflector 58 may be any suitable size, shape or color. For example, the retroreflector 58 may be a screen or sheet. A portion of the light beams 54 reflected off the retroreflector 58 pass through the beam splitter 56, continue toward the guest 62 and converge to form an image of the 2D source 20 (e.g., real image 60). Real images or aerial images may be generated when light beams appear to converge at a point in space. To the guest 62, the image of the 2D source 20 may appear to be floating in air or (depending on positioning of other features) appear to be supported by something in the environment. Although the real image 60 appears to be floating in air (or engaged in some way with a physical object present in the viewing area) to the guest 62, the real image 60 may be a mirrored reflection of the image of the 2D source 20 about the beam splitter 56.

Figure 3:
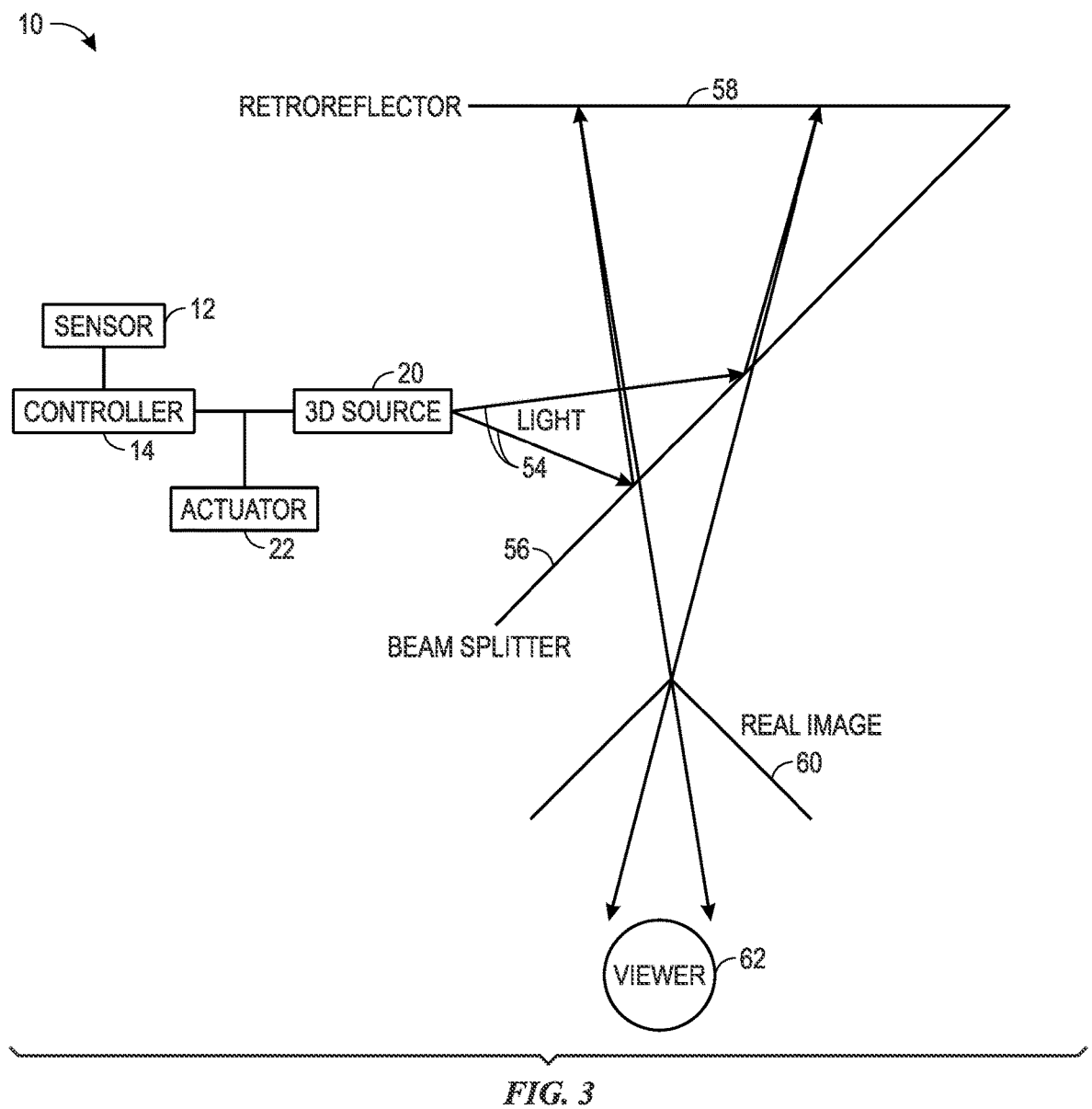
FIG. 3 is a schematic, plan view of the illusion system of FIG. 1 generating the real image based on a 3D source, in accordance with an embodiment of the present disclosure.

FIG. 3 depicts a schematic, plan view of the illusion system 10 in a configuration that generates the real image 60 based on a 3D image source 20 (e.g., 3D source 20), in accordance with an embodiment of the present disclosure. In some embodiments, the 3D source 20 may include a physical or 3D object illuminated by a light source (e.g., one or more LED string lights). Using an illuminated physical object as the 3D source 20 may result in a real image 60. In other embodiments, the 3D source 20 may include providing two images of the physical object, one image for each eye of a guest 62, such that the real image 60 appears to be a 3D image. Further, positioning of the 3D source 20 may be configurable based on the controller 14 receiving instructions from the one or more sensors 12 indicating an expected position of the real image 60. Based on the instructions from the controller 14, the actuator 22 may regulate the movement of the 3D source 20 (e.g., string light, projector, or display). A portion of the light beams 54 from the 3D source 20 may be reflected from the beam splitter 56 and directed towards the retroreflector 58 in a manner similar to that discussed above with respect to FIG. 2. As previously noted, the beam splitter 56 may be partially or fully transparent and may be composed of any suitable material such as glass or plastic. As mentioned above, the retroreflector 58 may be a device or surface that reflects light back to its origin with very limited scattering. That is, the retroreflector 58 may receive each light beam 54 at a particular angle and may reflect each light beam 54 back to its origin (e.g., the beam splitter 56) at the particular angle. The retroreflector 58 may be any suitable size, shape or color. The portion of the light beams 54 reflected off the retroreflector 58 may pass through the beam splitter 56 and converge to form an image of the 3D source 20 (e.g., real image 60). Real images 60 or aerial images may be generated when light beams appear to converge at a point in space. To a guest 62, the image of the 3D source 20 may appear to be floating in air or supported/ connected to an environmental feature. The real image 60 may be a mirrored reflection of the image of the 3D source 20 about the beam splitter 56.

Figure 4:
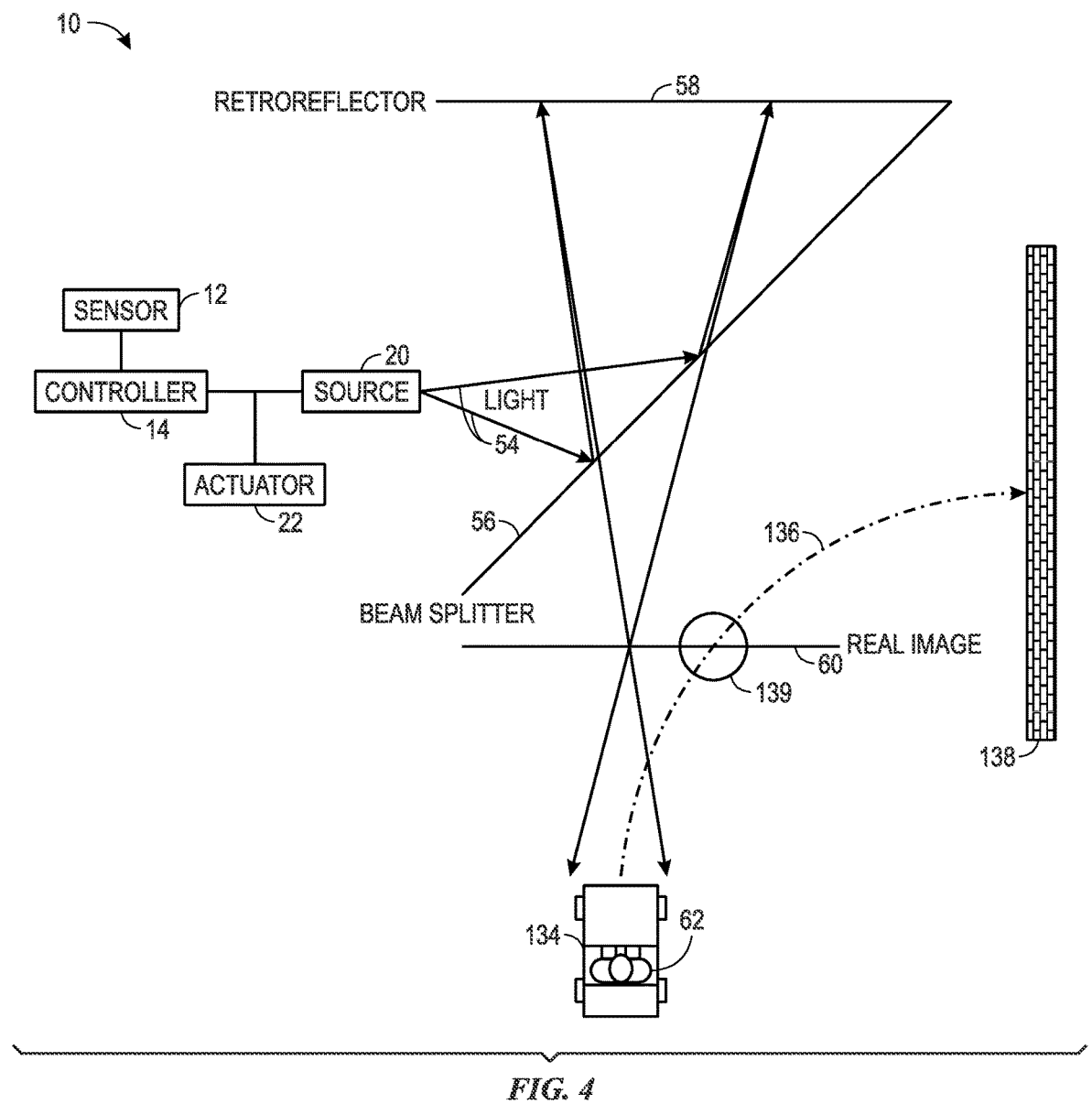
FIG. 4 is a schematic, plan view of the illusion system of FIG. 1 depicting a ride vehicle moving through the real image, in accordance with an embodiment of the present disclosure.

In some embodiments, special effects of the illusion system 10 may be presented to the viewer or guest 62 while the guest 62 is in a ride vehicle 134 that is moving along a ride track 136 (e.g., a path, a rail track, a guide rail, or travel space). As such FIG. 4 is a schematic, plan view of the illusion system 10 depicting a ride vehicle 134 moving through a real image 60. In FIG. 4, the image source 20 may be a 2D or 3D source. The positioning of the image source 20 may be configurable based on the controller 14 receiving instructions from the one or more sensors 12 indicating an expected position of the real image 60. Based on the instructions from the controller 14, the actuator 22 may regulate the movement of the 2D source 20 (e.g., string light, projector, or display). As with previously discussed embodiments, the illusion system 10 may cause the guest 62 (e.g., the guest 62 riding in the ride vehicle 134) to perceive the image of the 2D or 3D source 20 as physically present in the environment (e.g., sitting on or hovering above the ride track 136).

During a ride experience provided by the illusion system of FIG. 4 as the ride vehicle 134 moves along the ride track 136, the ride vehicle 134 may pass through the real image 60 (or, more specifically, the convergence point corresponding to where the real image 60 appears to be positioned within the environment) that has been generated via interaction of the light beams 54 with the beam splitter 56 and the retroreflector 58. When the ride vehicle 134 moves through the real image 60, it may appear to the guest 62 in the ride vehicle 135 as if the real image 60 transitions to an inverted version of the real image 60 relative to what was being viewed prior to passing through the real image 60, thereby confusing the guest 62. For example, if the real image 60 represents a projection of a house. The house may appear to become inverted to the guest 62 as he or she passes through the real image 60 via the ride vehicle 134 transitioning along the ride track 136. In order to avoid this, the controller 14 may invert media (e.g., a projection) provided with the image source 20 when the ride vehicle 134 has traveled through the real image 60. For example, if the image source 20 is a 2D source, the controller 14 may instruct a projector operating at the image source 20 to project an inverted image of the house. As such, when the guest 62 passes through the real image 60, the image of the house does not appear to be inverted relative to what was being viewed prior to transitioning through the real image 60 (or the convergence point) as the ride vehicle 134 moves along the ride track 136. In some embodiments, the media associated with the image source 20 may be turned off after the ride vehicle 134 and the guest have passed through the real image 60 such that the guest 62 may only see the real image 60 in front of him or her, rather than from behind. For example, the projection of the house may be turned off after the guest has passed through the real image 60. The one or more sensors 12 may track the movement and location of the ride vehicle 134, which may include detecting when the ride vehicle 134 is approaching and/or transitioning through the real image 60. In response to receiving an indication that the ride vehicle 134 is approaching the real image 60, passing through the real image 60, and/or has passed through the real image 60, the controller 14 may cause the media associated with the image source 20 to be inverted or turned off (e.g., deactivated or otherwise blocked form viewing by the guest 62). In some embodiments, structural features may block viewing of the real image 60 shortly before or after transitioning through the real image 60. In some embodiments, the structural features that block the real image 60 may be dynamic and actuated based on the movement or location of the ride vehicle 134, as determined via the one or more sensors 12. Also, dynamic props may be used to distract the guest 62 from observing the real image 60 as the real image 60 is approached or passed through.

In additional embodiments, rather than or in addition to inverting the image source 20 when the ride vehicle passes through the real image 60, the controller 14 may control the image source 20 such that the real image 60 (e.g., an animation or reflection of a dynamic prop) may appear to the guest 62 as though the real image 60 is breaking or shattering. This may include inverting supporting imagery or relying on the dynamic nature of the imagery to distract from the inversion resulting from transitioning viewing points, as discussed above. As an example, the real image 60 may appear to be a brick wall. When the controller 14 receives an indication from the one or more sensors 12 that the ride vehicle 134 and the guest 62 are passing through the real image 60 of the brick wall, the controller 14 may update the media associated with the image source 20 to generate another real image of the brick wall 138 shattering or breaking. Specifically, for example, a screen projection of an intact brick wall may transition to a screen projection of a shattering brick wall. In some embodiments, an actual brick wall prop may transition between an assembled configuration and a shattered configuration such that its reflection provides the real image 60. To create a special effect that appears to make the guest 62 feel as if he or she can physically interact with the real image 60, the controller 14 may activate haptics or a motion profile associated with the ride vehicle 134. For example, as the ride vehicle 134 passes through the real image 60 (e.g., representing a brick wall shattering or breaking), the ride vehicle 134 may shake to create an effect of simulating the ride vehicle 134 crashing into a physical structure. Such haptic or motion effects may be executed in real time or may be based on predefined timings of the movement of the ride vehicle 134. A tracking system based on the one or more sensors 12 may be used to track the location and movement of the guest 62 (e.g., when the ride vehicle is approaching the real image 60) to activate such effects. Further, physical props may be included to support or supplement these effects. For example, actual physical props that look like particles from a wall may be moved around the ride environment. As another example, an actual brick wall 138 that correlates to the imagery provided in the real image 60 may be provided with an opening 139 in it just after passing through the real image 60 to create a sense that the depicted breaking of the brick wall in the real image 60 resulted in the opening 139 in the actual brick wall 138. Likewise, other correlations between what is depicted in the real image 60 and what is provided in the ride environment may be provided.

In some embodiments, special effects of the illusion system 10 may involve the real image 60 being adjusted in any of various ways based on the position of the guest 62 and/or the ride vehicle 134. This may include adjustments to the image source 20 (e.g., 2D source, 3D source) including physical manipulation of the image source 20 (e.g., repositioning of the image source 20), controlled activation of the image source 20 (e.g., turning on some lights but not others), activation of media provided by the image source 20 (e.g., displaying video clips of animation), and the like. For example, the image source 20 may be adjusted such that a size of the real image 60 generated is increased or decreased.

Figure 5:
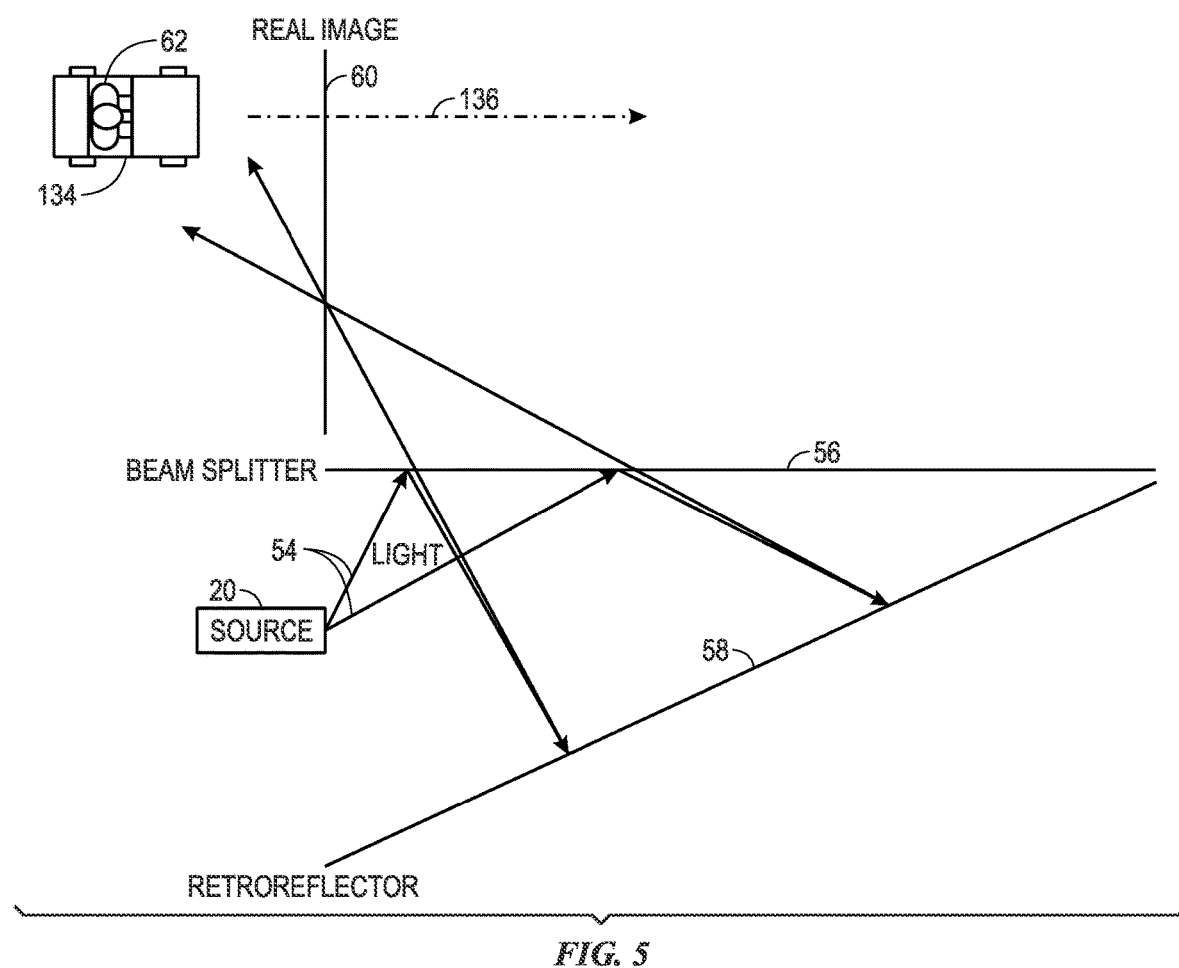
FIG. 5 is a schematic, elevational view of the illusion system of FIG. 4, in accordance with an embodiment of the present disclosure.

FIG. 5 is a schematic, elevation view of the illusion system 10 arranged such that aspects of the illusion system 10 are hidden from direct viewing by the guest 62 to increase immersion in the experience. As shown in FIG. 5, the image source 20 and the retroreflector 58 may be hidden from the guest 62. That is, the image source 20 and the retroreflector 58 may be disposed beneath the beam splitter 56 relative to the guest 62. As a result, when the ride vehicle 134 travels along the ride path 136, the guest 62 may not be able to look behind and see the image source 20 and the retroreflector 58. Again, this increases immersive aspects of the experience.

Figure 6:
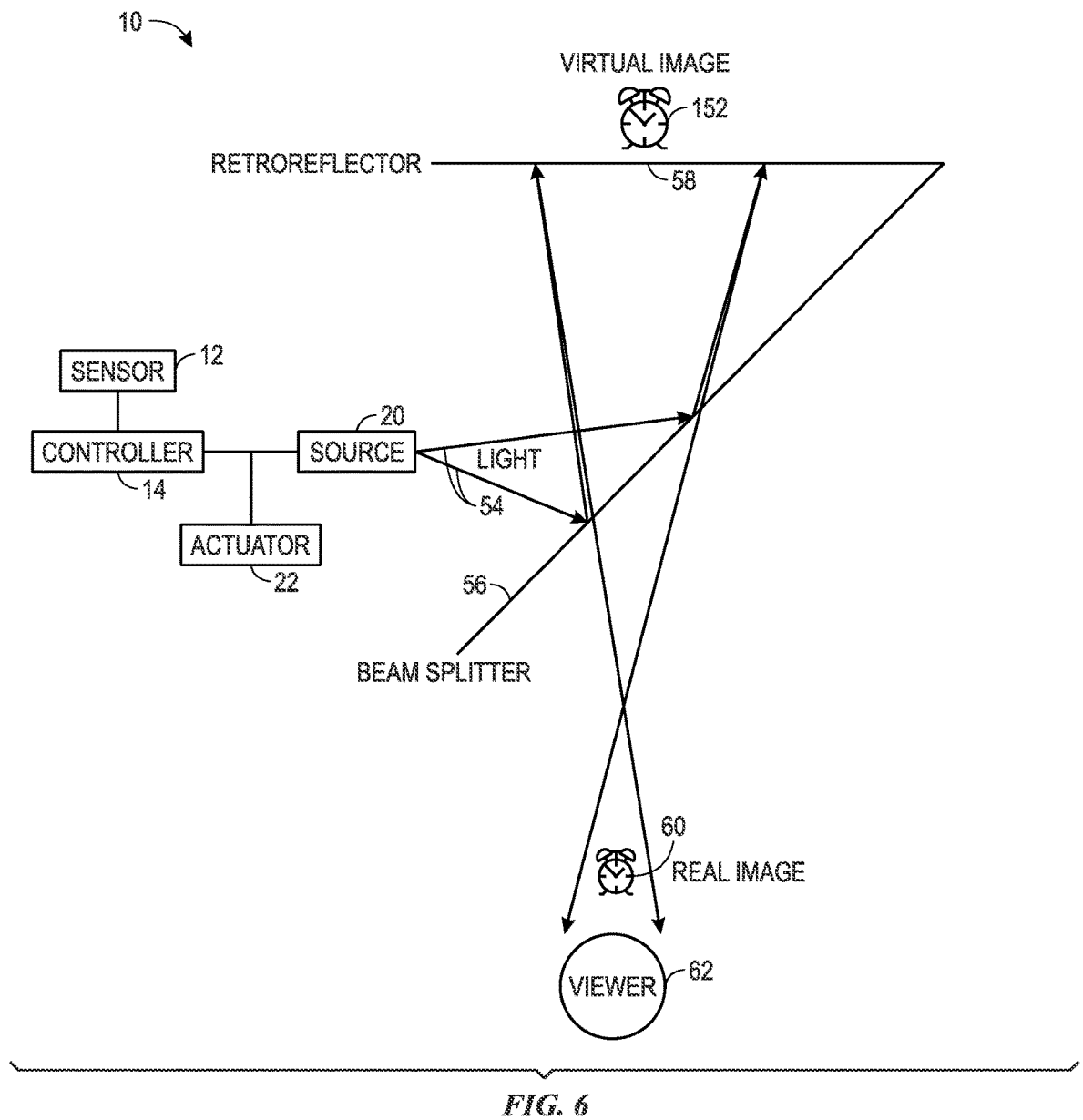
FIG. 6 is a schematic, plan view of the illusion system of FIG. 1 generating the real image in combination with a Pepper's ghost effect, in accordance with an embodiment of the present disclosure.

With the foregoing in mind, FIG. 6 is a is a schematic, plan view of the illusion system 10 of FIG. 1 generating the real image 60 in combination with a Pepper's ghost effect, in accordance with an embodiment of the present disclosure. For example, the image source 20 may be associated with projecting media that is representative of a lightning bolt. The positioning of the image source 20 may be configurable based on the controller 14 receiving instructions from the one or more sensors 12 indicating an expected position of the real image 60. Based on the instructions from the controller 14, the actuator 22 may regulate the movement of the 2D source 20 (e.g., string light, projector, or display). Similar to the above figures, the light beams 54 reflected off the retroreflector 58 may pass through the beam splitter 56 and converge to form the real image 60 based on the image source 20. The real image 60 or aerial image may be generated when the light beams 54 converge at a point in space. To the guest 62, the real image 60 of the lightning bolt may appear to be floating in air.

The retroreflector 58 may be gray in appearance and may not be appealing to view by the guest 62. In some embodiments, the retroreflector 58 may be altered with respect to visual appearance such that the appearance of the retroreflector 58 correlates in theme or visually with props, an environment, and like of an amusement theme park. The retroreflector 58 may be decorated to blend in within an environment and appear inconspicuous to the guest 62. For example, a colored, thin, and semi-transparent film may be placed between the retroreflector 58 and the viewer 62.

In additional or alternative embodiments, to prevent the guest from noticing the original appearance of the retroreflector 58 (e.g., appearance of a gray sheet), the retroreflector 58 may be hidden from the guest 62. In order to hide the retroreflector 58 from the view of the guest 62, a virtual image 152 via the Pepper's ghost effect may be generated in conjunction with the real image 60, generated via retroreflection. The Pepper's ghost effect utilizes reflective properties of translucent or transparent materials (e.g., glass, plexiglass, plastic, or polyester foil), such as the beam splitter 56, to provide images (e.g., the virtual image 152) for viewing by the guest 62. The virtual image 152 shown in FIG. 6 is illustrated where the viewer 62 would perceive it.

However, it is actually a reflection of a source 153 that is on the same side of the beam splitter 56 as the viewer 62. As noted above, this may work in conjunction with provision of the real image 60 to hide the nature of the retroreflector 58. For example, the beam splitter 56 may coordinate with the beam splitter 56 and the retroreflector 58 to provide the real image 60 while the source 153 coordinates with the beam splitter 56 in a different way to provide the virtual image 152 (or Pepper's Ghost effect). Thus, the guest 62 may view the virtual image 52 or the reflected image from the Pepper's ghost effect from the viewing area in conjunction with the real image 60. While the retroreflector 58 may still be visible from the line of sight of the guest 62 via the glass of the beam splitter 56, attention of the guest 62 may be directed towards the reflected imagery or virtual image 152 associated with the Pepper's ghost effect rather than the retroreflector 58. In some embodiments, the virtual image 152 may essentially cover or provide a pattern (e.g., an image of foliage) over the retroreflector. As such, the Pepper's ghost effect helps in hiding the retroreflector 58 or serves to distract the attention of the guest 62 from the retroreflector 58.

However, the intensity of light associated with the real image 60 may be higher than the intensity of light associated with the virtual image 152, such that the guest 62 is not distracted from the real image 60 by the Pepper's ghost effect.

Figure 7:
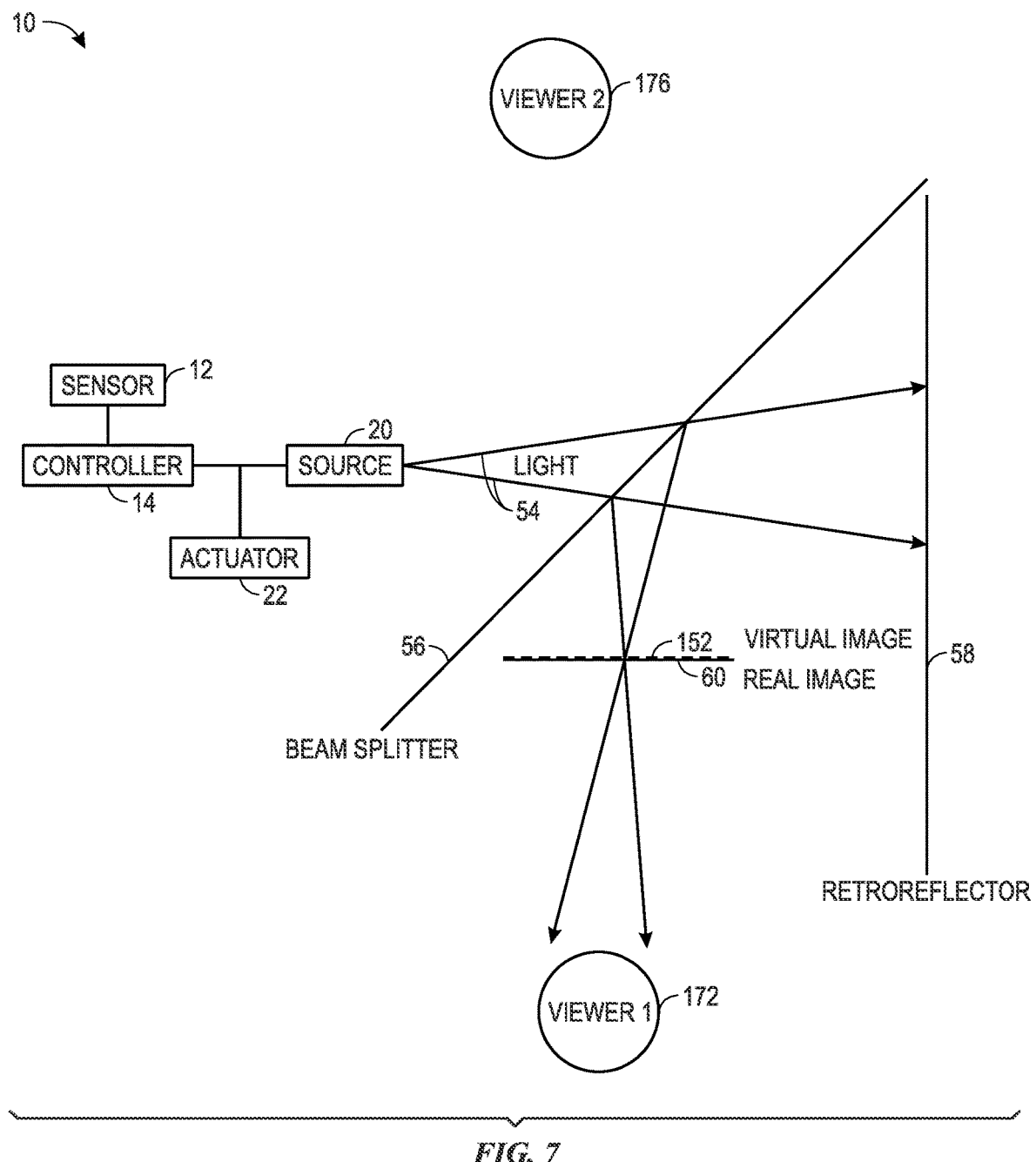
FIG. 7 is a schematic plan view of the illusion system of FIG. 1 providing a shared viewing experience of an image using the Pepper's ghost effect of FIG. 6, in accordance with an embodiment of the present disclosure.

FIG. 7 is a schematic, plan view of the illusion system 10 providing a shared viewing experience of an image using the Pepper's ghost effect of FIG. 6, in accordance with an embodiment of the present disclosure. The positioning of the image source 20 may be configurable based on the controller 14 receiving instructions from the one or more sensors 12 indicating an expected position of the real image 60. Based on the instructions from the controller 14, the actuator 22 may regulate the movement of the 2D source 20 (e.g., string light, projector, or display). Unlike FIG. 6, light beams 54 from the image source 20 may initially be transmitted or passed through the beam splitter 56 and directed to the retroreflector 58. The retroreflector 58 may receive each light beam 54 at a particular angle and may reflect each light beam 54 back to its origin (e.g., the beam splitter 54) at the particular angle. A portion of the light beams 54 may be reflected off the beam splitter 56 and converge to form an image of the image source 20 as the real image 60. Therefore, the guest 172 is able to view the real image 60 based on the media associated with the image source 20. Additionally, in conjunction with this retroreflection effect, a Pepper's ghost effect may be implemented as well. That is, another guest 176, who is on the opposite side of the beam splitter 56 from the guest 172, may be able to view a virtual image 152 of the media associated with the image source 20. Thus, both guests 172 and 176 may experience a shared viewing experience of the media associated with the image source 20.

Figure 8:
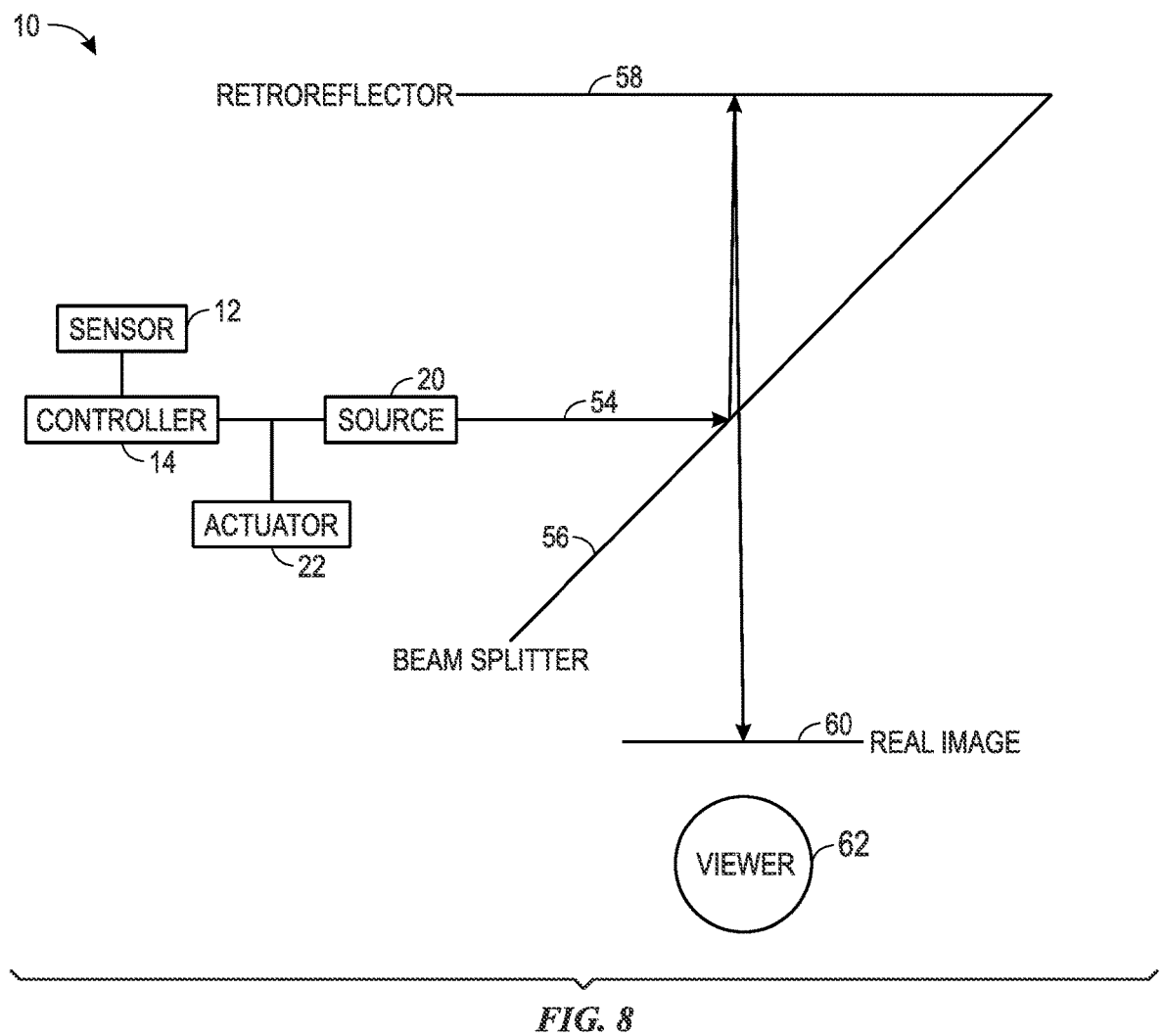
FIG. 8 is a schematic, plan view of the illusion system of FIG. 1 generating the real image with a narrow viewing angle, in accordance with an embodiment of the present disclosure.

FIG. 8 is a schematic, plan view of the illusion system 10 generating the real image 60 with a narrow viewing angle, in accordance with an embodiment of the present disclosure. For example, an amusement ride or game may involve a puzzle, in which the real image 60 may only be visible to guests who have found a clue or solved a puzzle. Solving the clue or puzzle may involve the guest 62 being positioned in a specific location that allows observation of the real image 60 while excluding viewing from others not in the position. In order to narrow the viewing angle of the real image 60, a collimator may be used as part of the image source 20. As described above, positioning of the image source 20 (e.g., including the collimator) may be configurable based on the controller 14 receiving instructions from the one or more sensors 12 indicating an expected position of the real image 60. Based on the instructions from the controller 14, the actuator 22 may regulate the movement of the image source 20. The viewing angle may be defined as the range of angles or positions via which a guest may be able to see the real image 60. As used herein, the collimator may be a device which narrows the light beams 54 (e.g., narrow beams of light used to generate a 2D or 3D real image), and thereby narrows a viewing angle of the real image 60. The narrow light beams 54 that are outputted from the collimator may be reflected off the beam splitter 56 and directed to the retroreflector 58. The retroreflector 58 may receive the narrow light beams 54 at a particular angle and may reflect the single beam of light 54 back to its origin (e.g., the beam splitter 56) at the particular angle. The narrow light beams 54 reflected off the retroreflector 58 may pass through the beam splitter 56 and converge to form an image of the light source 52 (e.g., real image 60). The real image 60 may be visible to the guest 62. By narrowing the viewing angle the real image 60 may not be visible to other guests near the guest 62. That is, the real image 60 may only be seen from the position that the guest 62 is disposed in. As such, if the guest 62 has found a clue in the amusement game, then he or she would be able to view the real image 60, unlike nearby guests who have not found the clue.

Figure 9:
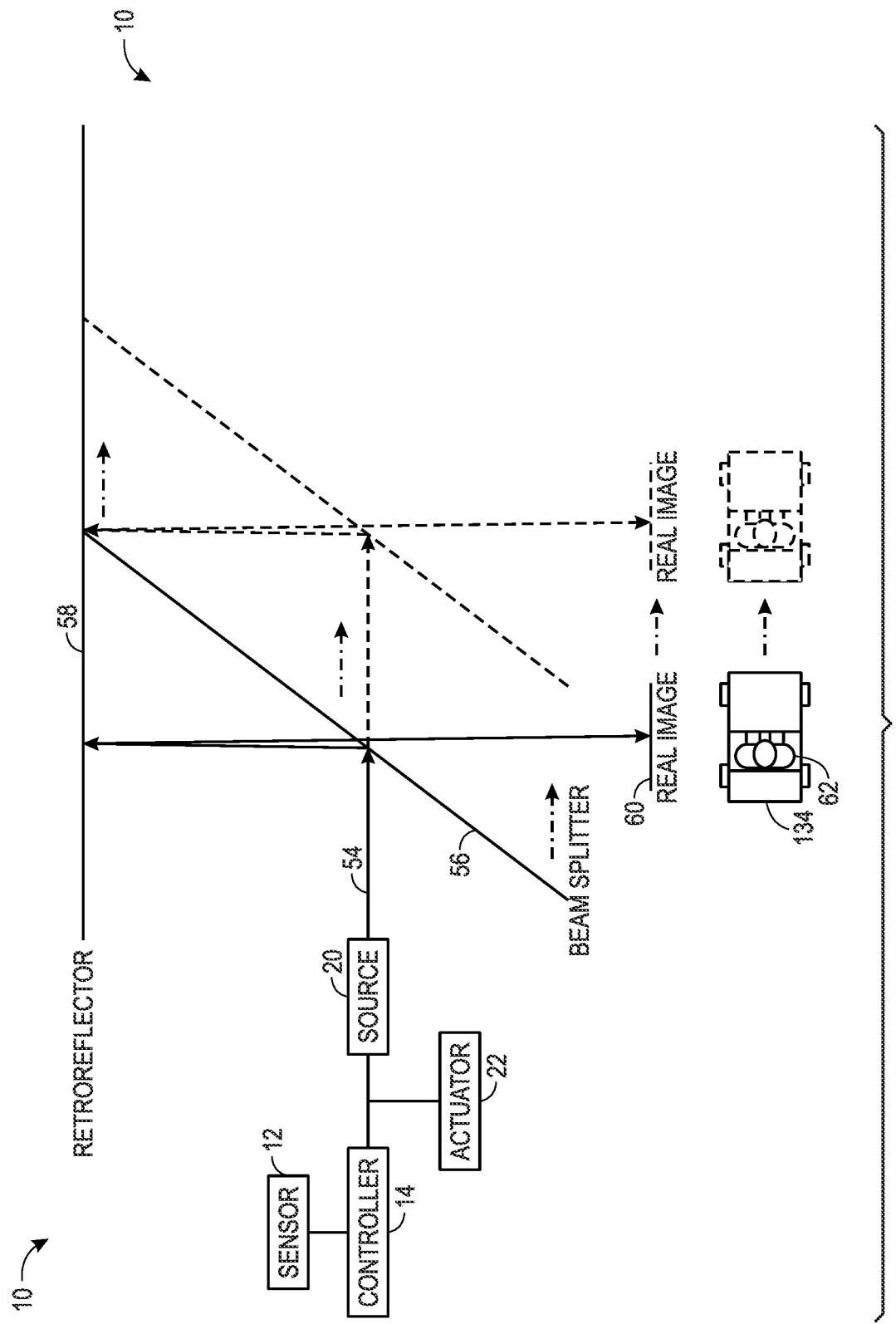
FIG. 9 is a schematic, plan view of the illusion system of FIG. 1 generating the real image with a rotating beam splitter, in accordance with an embodiment of the present disclosure.

FIG. 9 is a schematic, plan view of the illusion system 10 generating a real image with a rotating beam splitter 56, in accordance with an embodiment of the present disclosure. In this illustrated embodiment, the ride vehicle 134 is passing along the ride track 136 and the beam splitter 56 operates to rotate between positions (e.g., based on or timed with movement of the ride vehicle 134). Rotating the beam splitter 56 may shift the viewing angle of the real image 60. As the ride vehicle 134 moves along the ride track 136, the guest 62 continues to see the real image 60. The controller 14 may monitor or track the movement of the ride vehicle 134 via the one or more sensors 12 and instruct the actuator 22 to move the beam splitter 56 as the ride vehicle 134 moves. The actuator 22 may be coupled to the beam splitter 56. Rather than having to adjust the media associated with the image source 20, the controller 14 may rotate the beam splitter 56 in order for the viewing angle of the real image 60 to alter, allowing the guest to view the real image 60 as the ride vehicle 134 moves relative to other aspects of the illusion system 10. In some embodiments, the controller 14 may instruct rotation or movement of the beam splitter 56 at a similar rate as the movement of the ride vehicle 134.

Figure 10:
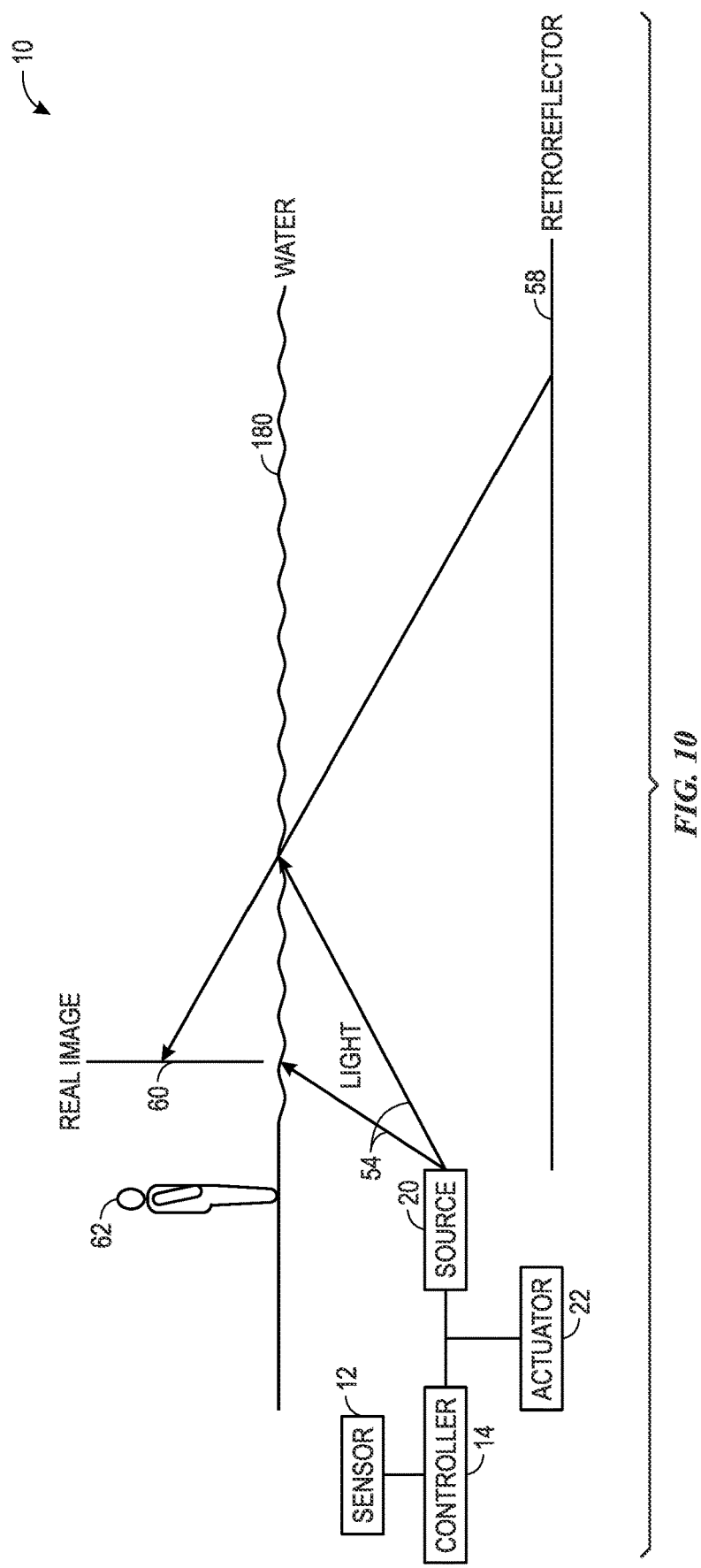
FIG. 10 is a schematic, plan view of the illusion system of FIG. 1 generating the real image using water as a beam splitter, in accordance with an embodiment of the present disclosure.

FIG. 10 is a schematic, plan view of the illusion system 10 generating the real image 60 using water as the beam splitter 180, in accordance with an embodiment of the present disclosure. For example, water may be used as the beam splitter 180 in water parks or amusement rides related to water. The image source 20 and the retroreflector 58 may be disposed under the water. For example, the bottom of the pool may server as the retroreflector 58. The retroreflector 58 may receive each light beam 54 at a particular angle and may reflect each light beam 54 back to its origin (e.g., the beam splitter 180) at the particular angle. A portion of the light beams 54 reflected off the retroreflector may pass through the beam splitter 180 (e.g., the water) and converge to form an image of the image source 20 (e.g., real image 60). To the guest 62, the image of the image source 20 may appear to be floating in air, floating on the water, or perched on a surface (e.g., a pool edge). The positioning of the image source 20 may be may adjusted based on the controller 14 receiving instructions from the one or more sensors 12 indicating an expected position of the real image 60 (e.g., floating on water, disposed on a pool edge). Based on the instructions from the controller 14, the actuator 22 may regulate the movement of the image source 20.

Figure 11:
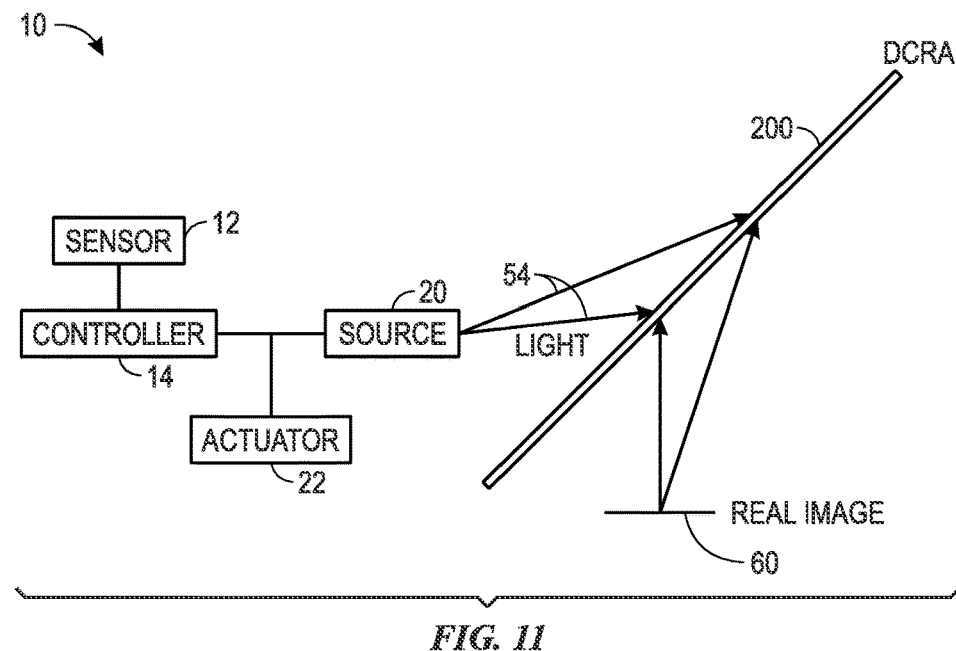
FIG. 11 is a schematic plan view of the illusion system of FIG. 1 generating the real image using a dihedral corner reflector array as the beam splitter, in accordance with an embodiment of the present disclosure.

Additionally, FIG. 11 is a schematic, plan view of the illusion system 10 generating the real image 60 using a dihedral corner reflector array (DCRA) 200 as the beam splitter, in accordance with an embodiment of the present disclosure. The DCRA 200 may include a sheet of acrylic or glass. Unlike the retroreflector 58, the DCRA 200 receives the light beams 54 from the image source 20 at a particular angle. Similar to the above figures, the light beams 54 may be emitted from the image source 20 (e.g., 2D source, 3D source). The positioning of the image source 20 may be configurable based on the controller 14 receiving instructions from the one or more sensors 12 indicating an expected position of the real image 60. Based on the instructions from the controller 14, the actuator 22 may regulate the movement of the image source 20 (e.g., string light, projector, or display). The light beams 54 may pass or transmit through the DCRA 200 at a similar angle to that at which the light beams 54 were received. After passing through the DCRA 200, the light beams 54 may converge to form the real image 60. In some embodiments, the DCRA 200 enables generation of the real image 60 without generating any virtual images.

Figure 12:
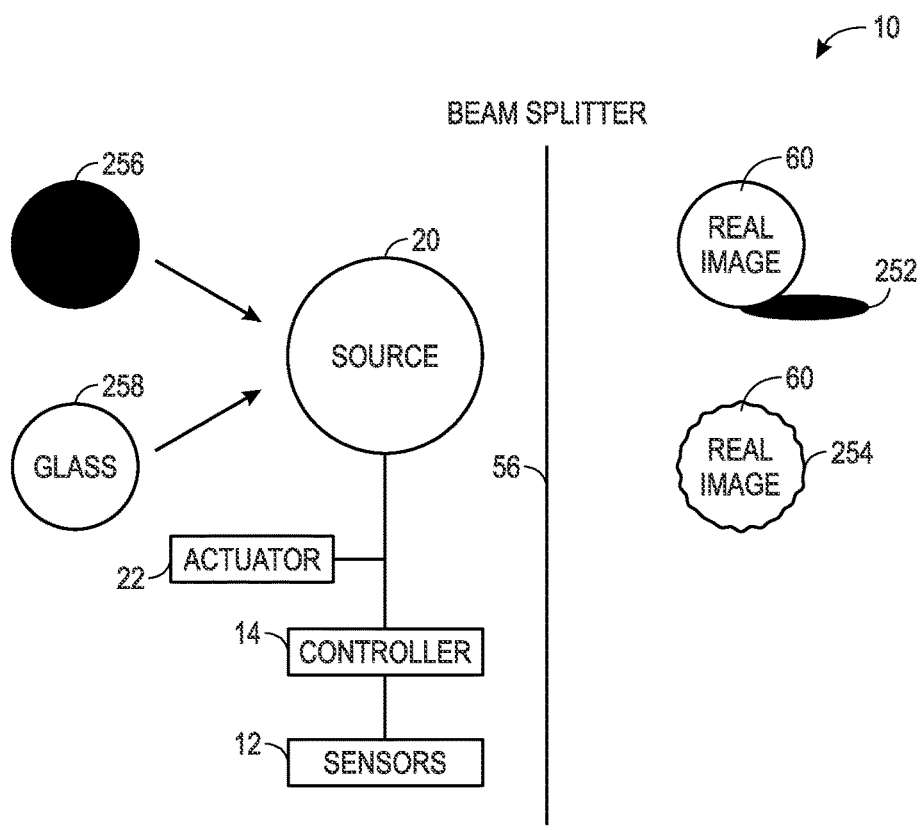
FIG. 12 is a schematic illustration of the illusion system of FIG. 1 providing immersive effects with respect to the real image by adjusting a light source, in accordance with an embodiment of the present disclosure

Because the real image 60 is provided to the audience for viewing by reflection and/or retroreflection, lighting associated with features of the 2D and/or 3D imagery being displayed (e.g., a character moving about in space) may not correlate with a manner that an audience would expect an actual feature to do. Retroreflection techniques using the image source 20 (e.g., a lamp, flashlight, flame or other luminous object) may not cause light and corresponding shadows to be generated in the real image 60. For example, the real image 60 of a character standing in space may be displayed to the audience. However, the real image 60 may not be able to cast shadows since the real image 60 does not block light passing through space. The real image 60 may appear unrealistic to the audience, who may expect the character standing in space to cast shadows. To enhance believability of the real image 60 and provide an immersive experience to the audience, the illusion system 10 may be used to light every surface of the space except where the shadow of the real image 60 would be if the real image 60 were a physical object. With the preceding in mind, FIG. 12, is a schematic illustration of the illusion system 10 providing immersive effects (e.g., casting shadows 252, creating refractive effects 254), by adjusting lighting associated with the image source 20.

The image source 20 may be coupled to any number or type of decorative lighting elements 250 that provide immersive effects (e.g., casting shadows 252, creating refractive effects 254) with respect to the real image 60. In some embodiments, the decorative lighting element 250 may include a filter 256 that covers a portion of the image source 20 to create shadows 252 in the real image 60. For example, after determining a location of the lighting or the image source 20 and an expected position of a shadow 252 cast by the real image 60 if it were tangible or a physical object (e.g., a character), the controller 14 may instruct an actuator 22 to place a filter 256 (e.g., silhouette of a character) on the image source 20 where the shadow 252 is expected to be cast. The filter 256 may be any suitable opaque material that blocks light from passing through the image source 20, thereby enabling the shadow 252 of the character to appear in the real image 60.

In additional and/or alternative embodiments, these immersive effects (e.g., the shadow 252) may be animated to update with a location and/or shape of the real image 60, the image source 20, and the decorative lighting elements 250 as well as with the physical space in which the real image 60 is displaced and the image source 20 is located. In some embodiments, adjustments to the image source 20 and/or the decorative light elements 250 may be based on pre-calculations of lighting within an environment to generate immersive effects. In other embodiments, updates to the image source 20 and/or the decorative light elements 250 may be calculated in real-time based on changes to lighting within the environment to generate the immersive effects. For example, one or more sensors 12 may monitor the location of the image source 20 and changes in lighting within the environment or the physical space. Based on such lighting information from the one or more sensors 12, the controller 14 may dynamically adjust the location, intensity, and other lighting properties of the image source 20 and/or the decorative light elements 250 to cast shadows 252 or generate other immersive effects in the real image 60.

In some embodiments, an environment, in which the real image 60 is displayed, may have particles in the air (e.g., dust, haze, or fog). With respect to such particles, not only may the shadow 252 be visible as light and dark areas on the surfaces of the environment, but also the shadow 252 may be visible as light and dark rays in the air due to the particles. To enhance the immersive effects and increase realism in an environment with such particles, the location of the image source 20 may correlate in location with the decorative light elements 250.

In other embodiments, two or more real images 60 and the decorative light elements 250 may be displayed to the audience. The decorative light elements 250 may be a part of the physical space or the real image 60. In some embodiments, because decorative light elements 250 may be expected to cast a shadow 252 of one object onto another object in the physical space, the locations and poses of each object and the decorative light elements 250 may be tracked to calculate where the shadows may be cast in the physical space. Thus, the objects that have shadows may be lit digitally or physically, such that corresponding real images 60 of the objects may have dark areas where the shadows may be cast.

In some embodiments, the real image 60 may be an object that may emit light (e.g., ball of fire, lightning bolt). Since the real image 60 may not emit light in all direction as a ball of fire or lightning bolt may do so in reality, the real image 60 of the ball of fire or the lightning bolt may appear unrealistic to the audience. Similar to the use of the illusion system 10 in generating a real image 60 of a character that may cast shadows, the illusion system 10 may be used to light surfaces of the physical space in which the real image 60 (e.g., the ball of fire, lightning bolt) is displayed to correlate with the effects that would have been seen if the real image 60 had been able to emit light.

In additional embodiments, the real image 60 may be generated on a refractive surface (e.g., in water, on a glass surface 258). As such, the illusion system 10 may include decorative light elements 250 that generate refractive properties 254 associated with the refractive surface (e.g., water, glass 258). For example, the audience may be able to see past a beam splitter 56 to a physical space behind the beam splitter 56 due to the refractive properties 254. The real image 60 may appear to refract light in a similar manner as if the real image 60 were a physical object within water, glass 258, or another refractive surface. If the real image 60 is generated via illumination of a physical object, a physical set (e.g., water, glass 258), in which the physical object may be located, may be placed behind the physical object to create effective refractive properties 254 with respect to the real image 60.

Figure 13A:
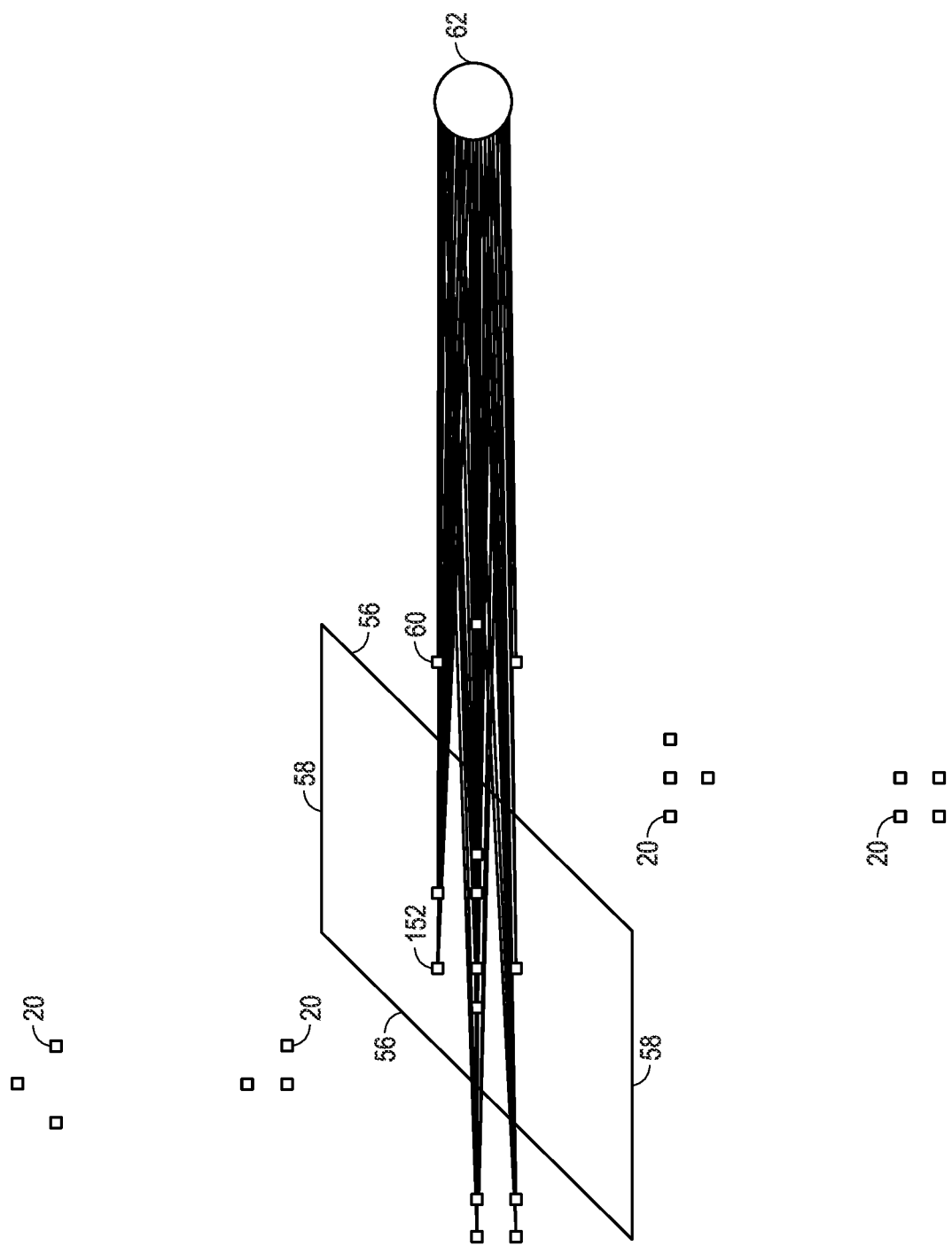
FIG. 13A is schematic plan view of the illusion system of FIG. 1 generating the real image using two beam splitters, two image sources, and two retroreflectors, in accordance with an embodiment of the present disclosure.
Figure 13B:
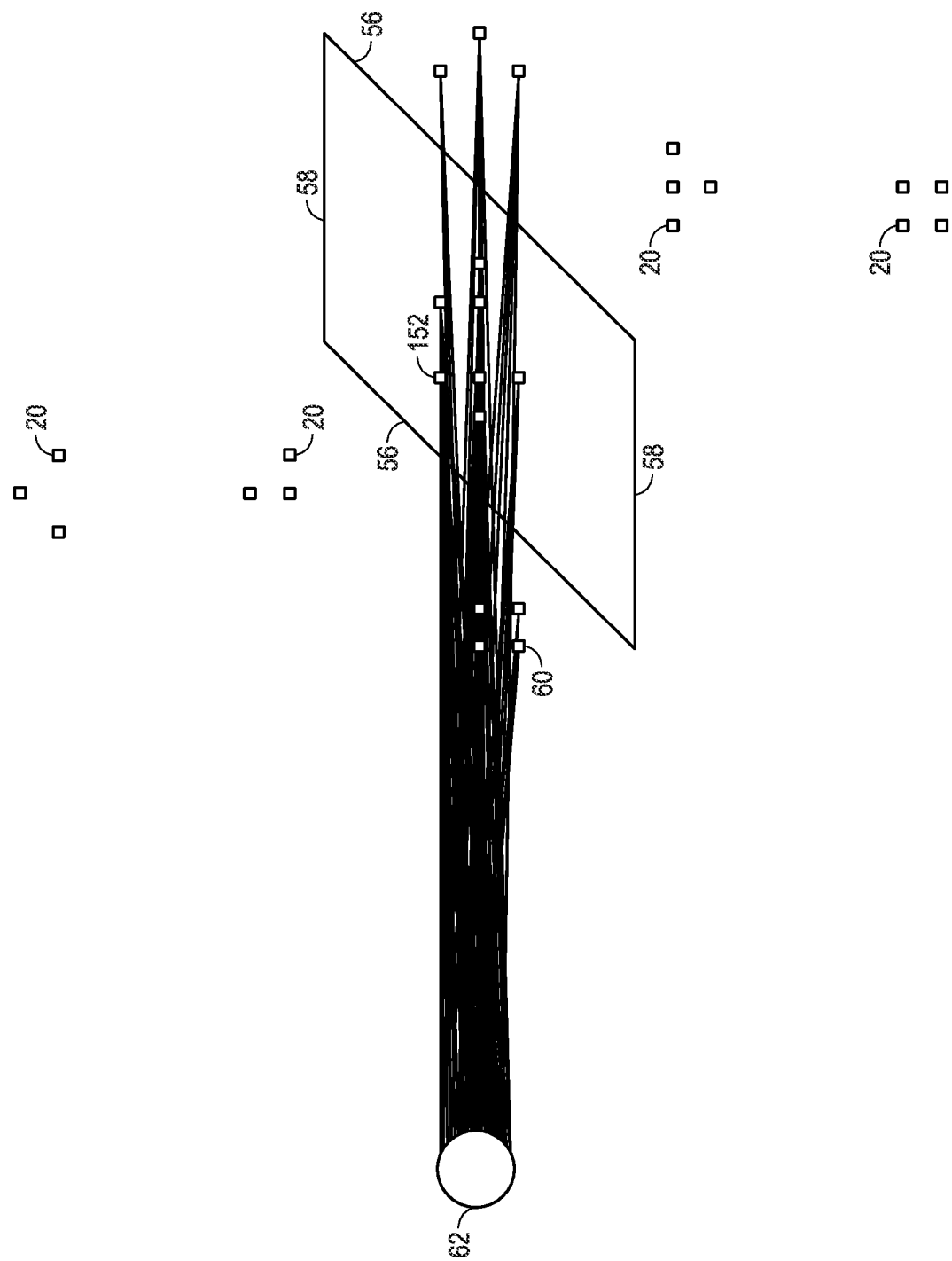
FIG. 13B is a schematic plan view depicting the real image of FIG. 13A that is viewed from a different position, in accordance with an embodiment of the present disclosure.

FIGS. 13A and 13B are schematic plan views of the illusion system 10 generating the real image 60 using two beam splitters 56, two image sources 20, and two retroreflectors 58, in accordance with an embodiment of the present disclosure. As illustrated, the positioning of the two beam splitters 56, two image sources 20, and two retroreflectors 58 allows the viewer 62 to view the real image 60 and the virtual image 152 from either side of the beam splitters 56. Specifically, FIG. 13A represents viewing from a first side and FIG. 13B represents viewing form a second side (opposite the first side). In some embodiments, the real image 60 may appear to travel from one side of the beam splitters 56 to another side (e.g., opposite side) of the beam splitters 56. By using at least two beam splitters 56, two image sources 20, and two retroreflectors 58, the real image 60 may appear to essentially seamlessly move from one side of the beam splitters 56 to another side of the beam splitters 56. By employing two beam splitters 56 in the arrangement illustrated in FIGS. 13A and 13B, a more fluid and continuous representation of the real image 60 can be provided relative to using a single beam splitter 56, which would leave a substantial inaccessible viewing area proximate the single beam splitter 56. Further, the arrangement in FIGS. 13A and 13B may allow the viewer 62 to see the same real image 60 from either side of the beam splitters 56.

Further, if the real image 60 is generated via a digital device (e.g., 2D screen, projector), computer-based simulations may be performed to determine how the real image 60 may appear to refract if it were a physical object (e.g., calculate the refractive properties 254 via the controller 14) from a particular perspective of a guest. The controller 14 may track the location of the guest to calculate the refractive properties 254 from the perspective of the guest. The refractive properties 254 may appear different or may not be fully accurate from other perspectives that do not correlate with the perspective of the guest.

To ensure that the refractive properties 254 are accurate regardless of a viewing position or particular perspective, in some embodiments, the real image 60 may be generated using a light field display. Using the light field display, the controller 14 may calculate how the real image 60 may appear to refract if it were a physical object (e.g., calculate the refractive properties 254) from every perspective that the real image 60 can be viewed from. As such, rather than tracking the location of the guest, the controller 14 may provide immersion effects such as accurate refractive properties 254 using the light field display.

Further, the immersive effects (e.g., casting shadows 252, creating refractive effects 254) described above may be applied simultaneously to the Pepper's Ghost effect in conjunction with the real image 60, such that both images (e.g., virtual image from Pepper's Ghost effect and the real image 60) appear to be emitting light, refracting light, and/or or casting shadows. That is, a viewer seeing the real image 60 and another viewer seeing the virtual image from the Pepper's Ghost effect may perceive the real image 60 and the virtual image as corresponding physical objects would behave in reality (e.g., cast shadows 252, refract light). In some embodiments, the illusion system 10 may include the controller 14 calculating location, intensity, and other parameters associated with auxiliary lighting, projection mapping, and other lighting effects based on every perspective or viewing position of both viewers. The view of the Pepper's Ghost effect may be similarly enhanced as the view of the real image 60, such that both the virtual image and the real image 60 may appear to cast shadows 252 and refract light. Further, it can be appreciated that the real image 60 may be generated with immersive effects using retroreflection, techniques involving DCRA, light field displays, and so forth.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An illusion system, comprising:
an image source configured to project light;
a retroreflector;
a beam splitter positioned between the retroreflector and a viewing area, wherein the beam splitter is configured to receive the light from the image source and reflect the light toward the retroreflector, wherein the retroreflector is configured to reflect the light back toward and through the beam splitter to define a real image for a viewer in the viewing area; and
a controller configured to control the image source to adjust the real image based on an expected position of the real image and a control parameter comprising a location of an individual or an object.

2. The illusion system of claim 1, comprising at least one sensor configured to detect a location of a display object as the control parameter, wherein the controller is configured to control the image source to provide the real image such that it appears spatially associated with the display object.

3. The illusion system of claim 2, wherein the controller is configured to instruct an actuator to move the image source such that a location of intersecting light beams defining the real image correlates to the location of the display object.

4. The illusion system of claim 1, wherein the controller is configured to instruct an actuator to move the image source such that a first angle of the image source to the beam splitter is similar to a second angle of the expected position of the real image displayed to the viewer.

5. The illusion system of claim 1, wherein the image source comprises a plurality of arranged lights, and wherein at least one light of the plurality of arranged lights is activated based on the expected position of the real image.

6. The illusion system of claim 1, comprising at least one sensor configured to detect the control parameter, wherein the sensor comprises a radio-frequency identification (RFID) sensor, a global positioning system (GPS) sensor, a camera sensor, a motion sensor, or any combination thereof.

7. The illusion system of claim 1, wherein the image source comprises a light assembly configured to manipulate outputs to control imagery provided by the image source based on instructions from the controller.

8. The illusion system of claim 1, wherein the image source comprises one or more string lights, a projector, or a display.

9. The illusion system of claim 1, wherein the beam splitter comprises glass, plexiglass, plastic, water, a dihedral corner reflector array (DCRA), or any combination thereof.

10. The illusion system of claim 1, comprising a ride vehicle operable to pass through a location of intersecting light beams defining the real image, wherein the controller is configured to change or disable presentation of the real image in response to a location of the ride vehicle relative to the location of the intersecting light beams.

11. The illusion system of claim 1, wherein the beam splitter is rotatable and the controller is configured to control movement of the beam splitter based on detected movement of a guest or ride vehicle.

12. The illusion system of claim 1, wherein the image source comprises a two-dimensional image source or a three-dimensional image source.

13. An illusion system, comprising:
one or more sensors configured to detect a location of a handheld object or person within a viewing area;
a beam splitter comprising a layer of material configured to both reflect and transmit light, wherein the beam splitter is positioned between the viewing area and a retroreflector;
an image source configured to direct light toward the beam splitter such that at least a portion of the light is reflected from the beam splitter toward the retroreflector and then reflected from the retroreflector back through the beam splitter to define a real image for viewing from the viewing area; and
a controller configured to determine an expected position of the real image and to control presentation of the real image based on data from the one or more sensors indicative of the location and based on the expected position.

14. The illusion system of claim 13, wherein the controller is configured to instruct an actuator to place a filter over the image source, wherein the filter is configured to create one or more shadows in the real image.

15. The illusion system of claim 14, wherein the controller is configured to instruct the actuator to place the filter over the real image based on an additional expected position of the one or more shadows.

16. The illusion system of claim 14, wherein the filter comprises an opaque material configured to block the light directed toward the beam splitter.

17. A method of providing a real image with an illusion system, the method comprising:
projecting light from an image source;
receiving the light from the image source at a beam splitter positioned between a retroreflector and a viewing area and reflecting the light from the beam splitter toward the retroreflector;
reflecting the light from the retroreflector back toward and through the beam splitter to define the real image for a viewer in the viewing area; and
controlling the image source to adjust the real image based on determining an expected position of the real image and a control parameter detected by at least one sensor, wherein the control parameter comprises a location of an individual or an object.

18. The method of claim 17, comprising instructing an actuator to move the image source based on an angle associated with the expected position of the real image.

19. The method of claim 17, comprising actuating a physical effect in conjunction with controlling the image source based on the control parameter.

20. The method of claim 17, comprising adjusting the image source by repositioning the image source, controlling activation of one or more lights of the image source, activating media provided by the image source, or any combination thereof.

* * * * *